United States Patent [19]

Gass

[11] 3,857,641
[45] Dec. 31, 1974

[54] OPTICAL MEASURING APPARATUS
[75] Inventor: Ernst Gass, Stuttgart, Germany
[73] Assignee: Firma Erwin Sick Optik-Electronik, Waldkirch, Germany
[22] Filed: Jan. 4, 1974
[21] Appl. No.: 430,703

[30] Foreign Application Priority Data
Jan. 23, 1973  Germany............................ 2303040

[52] U.S. Cl................................. 356/207, 356/206
[51] Int. Cl. .......................................... G01n 21/26
[58] Field of Search ........... 356/201, 204, 205, 206, 356/207, 208, 229

[56] References Cited
UNITED STATES PATENTS

| | | | |
|---|---|---|---|
| 3,761,724 | 9/1973 | Dennis................................ | 356/205 |
| 3,790,290 | 2/1974 | Muller et al. ....................... | 356/206 |
| 3,824,020 | 7/1974 | Pease................................. | 356/172 |

Primary Examiner—Ronald J. Stern
Assistant Examiner—Richard A. Rosenberger
Attorney, Agent, or Firm—McGlew and Tuttle

[57]  ABSTRACT

A smoke meter or a visibility meter comprises a light source in operative association with an optical system forming a light beam traversing a measuring distance at the end of which there is a reflex-reflector on which the light beam impinges. A beam splitter is positioned in the path of rays of the light beam and inclined with respect to the optical axis thereof, for example at a 45° angle, to direct light, reflected by the reflex-reflector, laterally of the optical axis as a measuring light flux. A photoelectric detector is positioned in the path of the light directed laterally of the optical axis by the beam splitter. A rotatable sector disc intersects the light beam between the beam splitter and the reflex-reflector, and is divided into sectors which are alternately transparent and diffusely reflecting. The sector disc produces a reference light flux from the light source and which impinges on the detector in alternation with the measuring light flux. In a preferred modification, a perforated disc, modulating the light beam, is secured on a common shaft with the sector disc, with the beam splitter being located between the perforated disc and the sector disc. The sector disc, in this case, is formed with two pairs of arcuate slots each extending through 90°, with the two pairs being angularly offset by 90° and the slots of one pair being diametrically opposite each other and offset radially with the corresponding slots of the other pair. Respective photoelectric detectors are positioned adjacent the two pairs of slots and are illuminated from the light source by a light conducting pipe or tube having an exit end aligned with the arcuate slots. Electronic evaluation circuits are connected to the outputs of the photoelectric detector receiving the measuring and reference light fluxes, and in the preferred embodiment, the electronic circuitry is also connected to the two photoelectric detectors associated with the arcuate slots in the sector disc.

10 Claims, 8 Drawing Figures

OPTICAL MEASURING APPARATUS

FIELD AND BACKGROUND OF THE INVENTION

This invention relates to optical measuring apparatus, such as smoke meters or visibility meters, of the type in which both a measuring light flux, reflected from a reflex-reflector at the end of a measuring distance, and a reference light flux from the original light source are directed onto a photoelectric detector. More particularly, the present invention is directed to such an optical measuring apparatus which is less complex than known apparatus of this type and in which the time and cost of adjustment as well as the cost of means for electronically processing the detector signals are greatly reduced.

In a prior art apparatus of this type, shown in German DAS 1,722,064 and U.S. Pat. No. 3,617,756, a beam emanating from a light source is received and collimated by a lens. A second lens focuses this light beam substantially on a circular array of perforations of a perforated disc. A partially transparent mirror is positioned in the parallel path of rays between the two lenses, at an angle of 45° to the optical axis of the light beam, and a partial beam is reflected by this mirror to form a reference light beam. By means of a further mirror, this partial beam is again deflected through 90° so that it is parallel to the measuring light beam. A lens focuses the reflected "reference light beam" on a second circular array of perforations of the perforated disc.

A micro-objective is located behind the perforated disc, and an image of the light source, formed in front of the circular array of perforations, is again imaged by the micro-objective on a front lens which forms a collimated light beam. A beam-limiting diaphragm, located in the collimated path of rays between the first-mentioned two lenses is, at the same time, imaged in the plane of a reflex-reflector as a uniformly illuminated light spot. A similar micro-objective is located behind the second circular array of perforations.

A light beam reflected by the reflex-reflector is directed onto a photoelectric detector by means of a partially transparent mirror. The "reference light beam," which has been reflected back upon itself by a concave mirror in the casing of the apparatus, is reflected into this latter path of rays by means of further partially transparent mirrors. Due to the different modulations of measuring and reference light beams, the signals resulting therefrom can be separated by electronic means, and the ratio of the light fluxes of the two light beams can be formed electrically. By the use of such a reference beam and by forming the ratio, the influences of variations of lamp brightness, of variations of detector sensitivity, or of variations of gain in the signal processing circuit, can be compensated.

The apparatus comprising such a reflected reference light beam becomes, however, rather complex and expensive. A large number of optical elements, such as lenses and mirrors, is required, and these optical elements not only have to be provided but also have to be very carefully adjusted, whereby the assembly costs are increased.

SUMMARY OF THE INVENTION

The optical measuring apparatus of the invention comprises a light source, an optical system for forming a light beam traversing a measuring distance, a reflex-reflector positioned in the path of the light beam at the end of the measuring distance and impinged upon by the light beam, and a beam splitter located in the path of rays of the light beam and inclined with respect to the optical axis thereof. Light returned by the reflex-reflector is directed by the beam splitter, as a measuring light flux, onto a photoelectric detector. Means are provided for producing a reference light flux, impinging upon the photoelectric detector, in alternation with the measuring light flux.

It is an object of the invention to provide an optical measuring apparatus, of the type mentioned, comprising less complex means and to reduce the time and costs of adjustment as well as to reduce the complexity and costs of the means for electronically processing the detector signals.

In accordance with the invention, the means for producing the reference light flux is a surface periodically movable into the path of rays of the light beam and reflecting in a substantially diffuse manner. In a structure of this type, a path of rays for a separate reference light beam is no longer necessary. The detector receives, periodically between the measuring light flux reflected by the reflex-reflector, a reference light flux which is produced by the diffuse reflection on the diffuse reflection surface movable into and out of the single path of rays. Due to the diffuse reflection, the adjustment of the surface movable into the path of rays is not critical. A rather exactly defined reference light flux is obtained, which impinges on the detector in alternation with the measuring light flux. By means of an appropriate phase control, the processing of the signals thus obtained is very simple.

Advantageously, the diffusely reflecting surface is a rotatable sector disc extending into the path of the rays. This sector disc may have two diametrically opposite vanes or sectors each extending through 90°. In a preferred embodiment, the sector disc comprises a circular central portion having two pairs of circular arcuate slots, each slot extending through 90° and the two pairs of slots being angularly offset relative to each other by 90°. The slots of one pair are diametrically opposite each other and are offset radially with respect to the diametrically opposite slots of the other pair. Respective radially offset photoelectric detectors are arranged to be illuminated through the slots of each pair to produce trigger signals to be applied to a signal processing circuit. In this embodiment, the two photoelectric detectors are illuminated through at least one light pipe or conduit extending from the light source to the sector disc.

In order to eliminate the influence of external light, a perforated disc, modulating the light beam, is mounted on a common shaft with the sector disc, and the beam splitter is located between the perforated disc and the sector disc. Thereby, the light beam is modulated, so that the influence of external light can be eliminated. In contrast to prior art apparatus mentioned above, in this type of modulation, there is only one single modulation frequency, so that signal processing is substantially simplified.

In the preferred embodiment, the output signal from the photoelectric detector is applied to first and second amplifier and memory circuits through controlled electronic switches actuated in synchronism with the change between the measuring and reference light fluxes, the outputs of the first and second amplifier and memory circuits being applied to a quotient-forming circuit to form the quotient of the two light fluxes. In the case of modulation of the light beam by means of the perforated disc, the output signal from the photoelectric detector may be applied to the controlled electronic switches through an active high-pass filter and a rectifier.

An object of the present invention is to provide an improved optical measuring apparatus, such as a smoke meter or a visibility meter.

Another object of the invention is to provide such an optical measuring apparatus comprising less complex means and requiring less time and cost for adjustment.

A further object of the invention is to provide such an optical measuring apparatus in which the complexity and costs of means for electronically processing detector signals are greatly reduced.

For an understanding of the principles of the invention, reference is made to the following description of typical embodiments thereof as illustrated in the accompanying drawings.

DETAILED DESCRIPTION OF THE PREFERRED EMBODIMENTS

Figure 1:
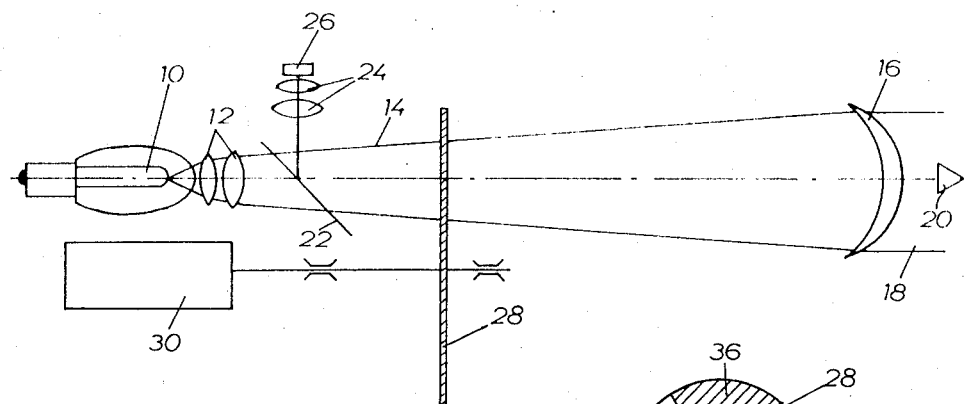
FIG. 1 is a schematic illustration of a first and simplest embodiment of the invention.
Figure 2:
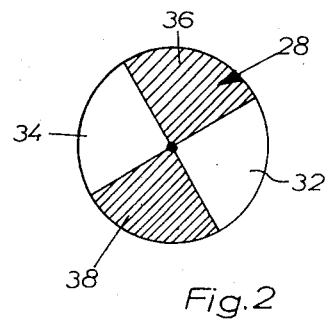
FIG. 2 is an elevation view of a sector disc of the embodiment of the invention shown in FIG. 1.

Referring first to FIGS. 1 and 2, a light beam 14, emanating from a light source 10, is directed by a lens system 12 to a front lens 16. Front lens 16, in turn, directs a collimated light beam along a measuring path to a reflex-reflector 20, designed to reflect light incident thereupon always back into its direction of incidence. The reflected light beam falls on a partially transparent mirror 22, forming a beam splitter, inclined at an angle of 45° with respect to the optical axis of the light beam, and is partially reflected by mirror 22 and focused onto a photoelectric detector 26 by an optical system 24. A circular disc 28, shown in FIG. 2 in elevation, extends into beam 14, disc 28 being driven by a motor 30. Sector disc 28, as best seen in FIG. 2, is transparent in two diametrically opposite sectors 32 and 34, each extending through 90°, and is diffusely reflecting in the two other sectors 36 and 38, which are diametrically opposite each other and extend through 90°.

Photoelectric detector 26 has impinging thereon, in alternation, a measuring light flux which is returned by reflex-reflector 20 and reflected laterally of the optical axis by the partially transparent, and partially reflecting, mirror 22, and by a reference light flux which is diffusely reflected by sectors 36 or 38, respectively, and is also deflected laterally of the optical axis by partially transparent mirror 22 towards detector 26.

This latter light flux, or reference light flux, is dependent, in a well-defined manner, upon the brightness of light source 10. The signal produced thereby is furthermore a function of the sensitivity of photoelectric detector 26 and of the gain of an amplifier, if any, to which the detector signal may be fed. Thus, a correct reference signal can be produced by the diffusely reflected light flux. As compared to prior art apparatus, there are, however, no optical elements used to form a reference beam and requiring accurate adjustment. Due to the diffuse reflection at sectors 36 and 38, the adjustment of sector disc 28 is not critical.

The embodiment of the invention shown in FIGS. 1 and 2 is sensitive to external light. This problem is obviated, in the preferred embodiment shown in FIG. 3, by modulating the light.

Figure 3:
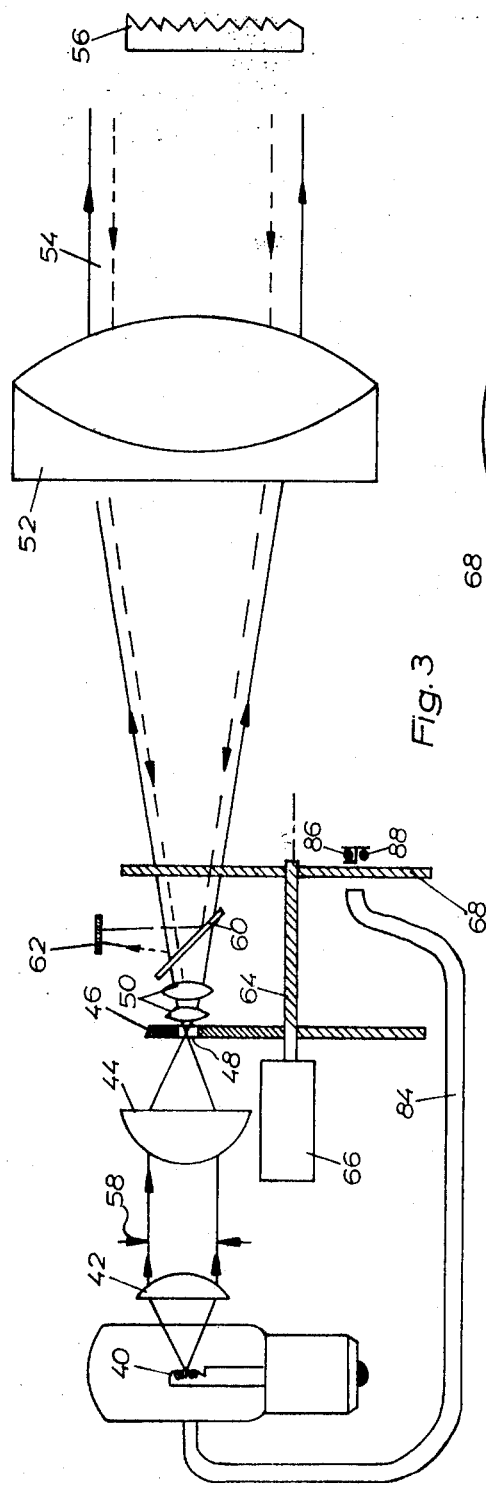
FIG. 3 is a schematic illustration of a preferred embodiment of the invention.

In the embodiment of the invention shown in FIG. 3, light from a light source, such as the lamp filament 40, is directed by a lens 42 which collimates the light onto a lens 44 which focuses the light beam in the plane of a perforated disc 46 and particularly on a circular array of perforations 48 in disc 46. A micro-objective 50 is located behind the circular array of perforations 48, and a front lens 52 produces a collimated light beam 54 which is directed through a measuring distance and impinges on a reflex-reflector 56. Reflex-reflector 56 is a triple reflector composed of a large number of small reflecting cube corners, and the dimensions of triple reflector 56 are smaller than the cross-section of beam 54. Thus, provision must be made to produce a uniformly illuminated light spot in the plane of triple reflector 56, so that relative adjustment of the source-detector-unit and of the triple reflector is not critical. Thus, it is not permissible to have the filament structures of the light source appearing in this plane.

In the embodiment of the invention shown in FIG. 3, this is attained by imaging light source 40 by micro-objective 50 on front lens 52, and by imaging also a beam limiting diaphragm 58, located in the collimated path of rays between lenses 42 and 44, in the plane of triple reflector 56. The beam limiting diaphragm 58 is substantially uniformly illuminated. The light beam, reflected by reflector 56, is indicated by dashed lines and falls on a semi-transparent mirror 60 by which it is partially reflected to a photoelectric detector 62, laterally of the optical axis. In this path of rays, a light flux depending on the state of the measuring distance, impinges on photoelectric detector 62, this light flux depending, for example, on the percentage of light lost due to absorption along the measuring distance.

A sector disc 68 is mounted on shaft 64 of perforated disc 46, shaft 64 being driven by a motor 66. Sector disc 68 extends into the path of rays between partially transparent mirror 40 and front lens 52. Thus, the partially transparent mirror 60 and the micro-objective 50 are located between perforated disc 46 and sector disc 68.

Figure 4:
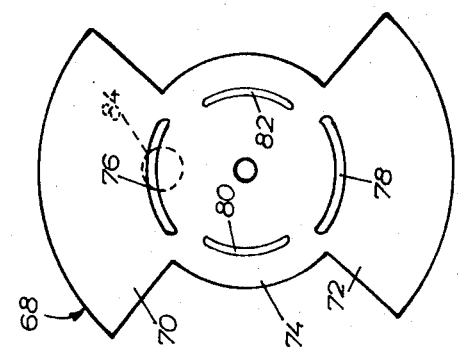
FIG. 4 is an elevation view of the sector disc of the embodiment of the invention shown in FIG. 3.
Figure 5:
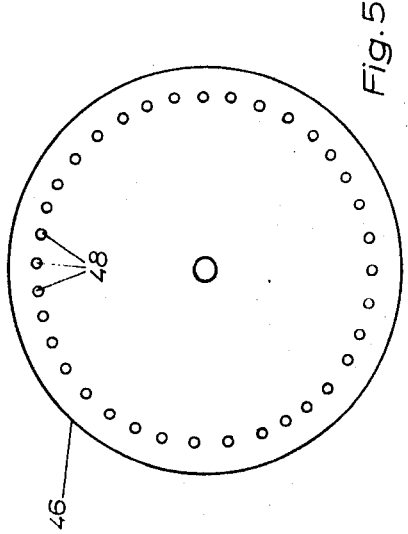
FIG. 5 is an elevation view of a perforated disc in the embodiment of the invention shown in FIG. 3.

As best seen in FIG. 4, sector disc 68 has two vanes or sectors 70 and 72, each extending through an angle of substantially 90°, the two vanes being diametrically opposite with respect to shaft 64. In addition, sector disc 68 includes a circular central portion 74. Two pairs of circular arcuate slots 76, 78 and 80, 82, respectively, are provided in central portions 74, each slot extending through an angle of 90°. Slots 76 and 78 are diametrically opposite each other and are offset by 90° with respect to the slots 80 and 82. In addition, slots 76 and 78 are offset radially with respect to slots 80 and 82, for example they are located on a larger radius.

Light from light source 40 is conducted by a light pipe or conduit 84 from light source 40 to the region of slots 76 – 82. Two photoelectric detectors, such as two phototransistors, are located on that side of sector disc 68 remote from the light emitting end of light pipe or conduit 84, one phototransistor 86 being located on the radius of slots 80 and 82, and the other phototransistor 88 being located on the radius of slots 76 and 78. Respective trigger signals, having a relative phase shift of 90°, to control the processing circuit, are produced by phototransistors 86 and 88.

Figure 6:
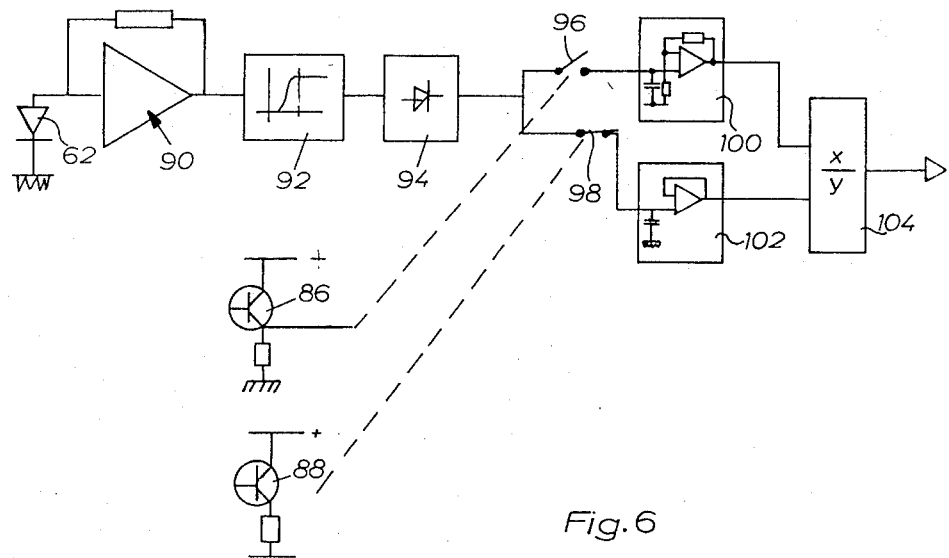
FIG. 6 is a schematic block diagram of the electronic circuitry of the embodiment of the invention shown in FIG. 3.

The processing circuit is shown in schematic block diagram in FIG. 6. The signal from photoelectric detector 62, which may be, for example, a photovoltaic cell, is amplified by an amplifier 90, and an active high-pass filter 92 eliminates the DC component from this signal. Such DC component may be due to non-modulated external light, for example. The AC signal thus obtained is rectified by an ideal rectifier 94.

Photoelectric detector 62 produces a pulse sequence due to the modulation of the light by perforated disc 46, and this pulse sequence usually is superimposed on a DC component due to the non-modulated external light. This component, as stated, is eliminated by the active high-pass filter 92. Ideal rectifier 94 rectifies the pulses remaining after elimination of the DC component, whereby a smoothed signal is obtained whose level is proportional to the amplitude of the individual pulses. Photovoltaic cell 62 is alternatingly impinged upon by a measuring light flux, modulated at the frequency of the circular array of perforations 48, when sectors 70 and 72 are outside the path of rays, and the light is directed along the measuring distance, or by a reference light flux, when one of the sectors 70 or 72 extends across the path of rays and the light is diffusely reflected to reach detector 62.

Thereby, a square wave signal, having a frequency of twice the angular velocity of sector disc 68 is produced at the output of rectifier 94. Electronic switches 96 and 98 are controlled, in phase opposition, with this frequency or, if taken in relation to the amgular velocity of sector disc 68, with a 90° phase difference. The signal resulting from the measuring light flux is fed to an amplifier and memory unit 100, and the signal resulting from the reference light flux is fed to an amplifier and memory unit 102. Units 100 and 102 are connected to a ratio forming circuit 104 which, for example, produces a signal proportional to the transmission along the measuring distance.

With the apparatus described, the operation of the source-detector-unit is not affected by its adjustment relative to reflector 56, due to the uniform illumination in the plane of reflex-reflector 56. There is a modulation of the light, so that the apparatus is not affected by external light. A single motor is required to drive both perforated disc 46 and sector disc 68 at exactly the same speed, so that the design becomes very simple. By using diffusely reflected radiation as a reference light flux, there is little influence of the adjustment of the sector disc. Although a modulation of the light is provided, there is only one modulation frequency, and demodulation can be effected by a simple rectifier. The control by means of optical control elements, such as phototransistors 86 and 88, makes the processing circuit extremely simple and reliable.

There can be invalidation of the measurement due to contamination of the front lens, by which the apparatus is closed toward a measuring path, for example, a flue gas channel. This contamination can be determined and thus taken into consideration by measures which will now be described.

Optionally, or at fixed time intervals, for example every hour, a reflex-reflector, which is practically 100 percent reflecting, is moved into the path of rays on the side toward the apparatus, that is, at the front end of the measuring distance. Thereby, the measuring light beam passes twice through the front lens as during normal operation, and is attenuated by any contamination of this front lens in the same way, without, however, being subjected to the attenuation along the measuring distance. This measuring light flux, reflected by the 100 percent reflector, is compared to the reference light flux. From this, the degree of contamination of front lens 52 is derived and taken into consideration during normal operation of the apparatus.

Figure 7:
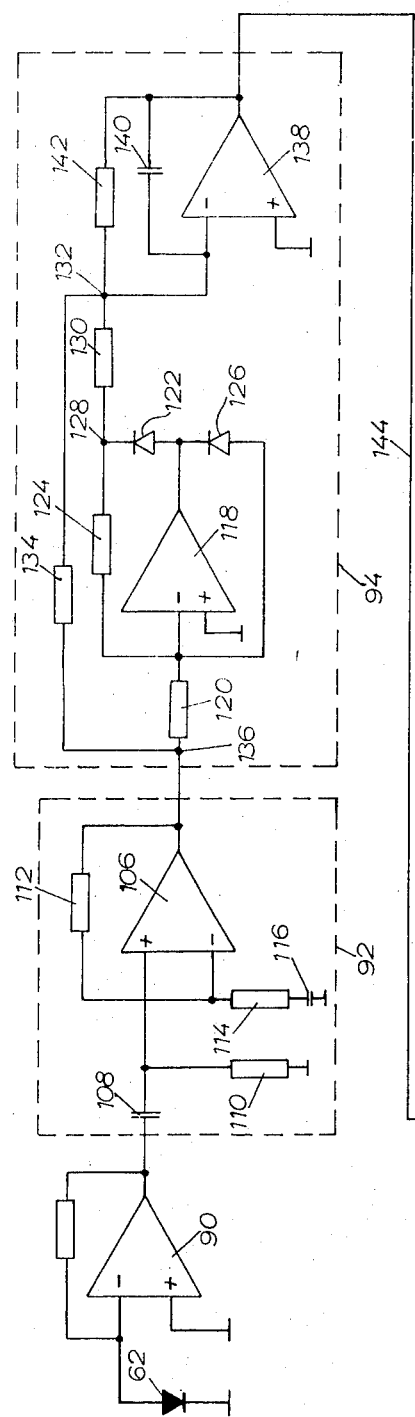
FIG. 7 is a schematic wiring diagram corresponding to the block diagram of FIG. 6.
Figure 7:
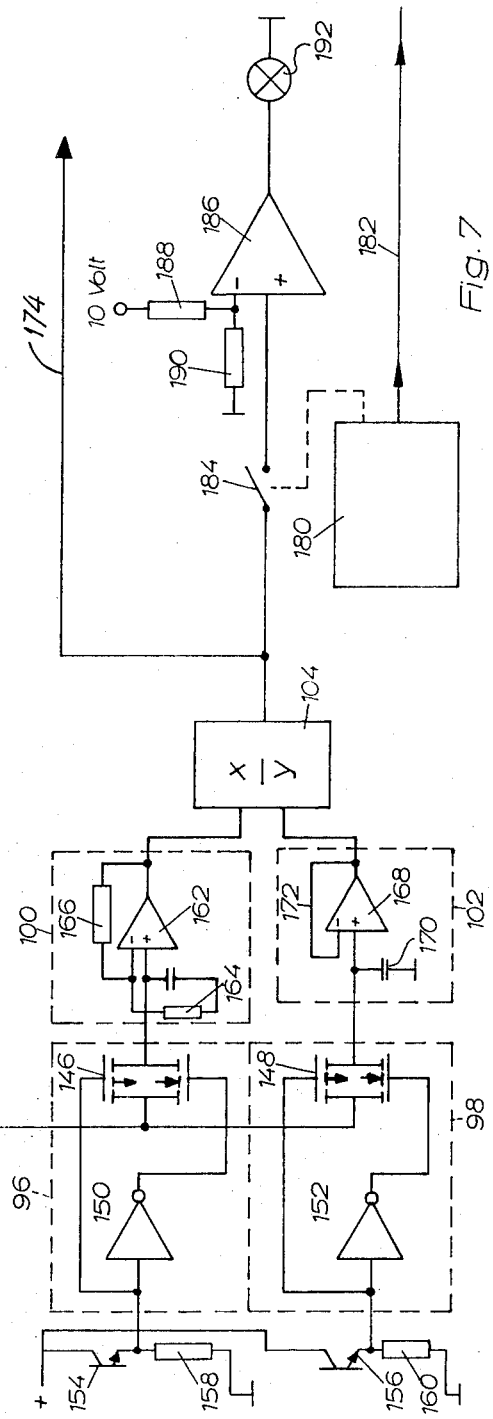
Figure 8:
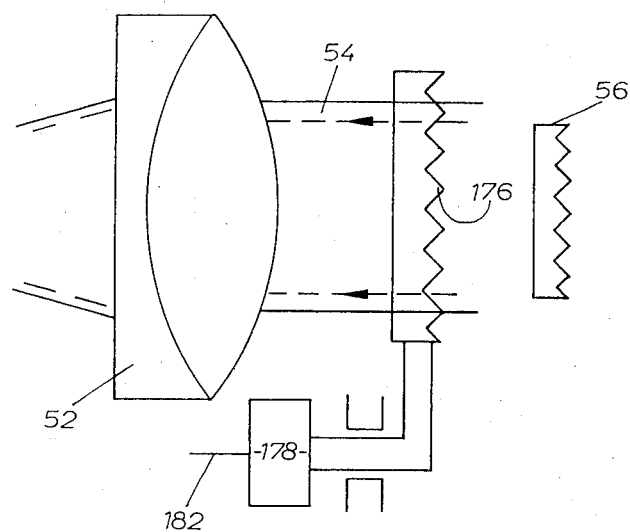
FIG. 8 is a schematic elevation view of a further modified embodiment of the invention.

Such an arrangement is shown in FIGS. 7 and 8, with FIG. 7 being the wiring diagram of the arrangement, using the same reference numerals as in FIG. 6 for corresponding elements, and FIG. 8 showing the physical arrangement. Referring to FIG. 7, the pulse sequence from photoelectric detector 62 is amplified by amplifier 90 and applied to active high-pass filter 92 to eliminate the DC component. High-pass filter 92 comprises an operational amplifier 106, whose non-inverting or positive input is connected to the output of amplifier 90 through a capacitor 108, and to ground through a resistor 110. There is a negative feedback from the output of amplifier 106 to its inverting or negative input through a resistor 112, and the inverting or negative input, in turn, is connected to ground through a resistor 114 and a capacitor 116.

The signal, with the DC component eliminated, is applied to a rectifier circuit 94 comprising an operational amplifier 118 whose non-inverting or positive input is grounded and whose inverting or negative input is connected to the output of high-pass filter 92 through a resistor 120 having a certain resistance R. The output of operational amplifier 118 is also connected to the inverting or negative input thereof through a feedback loop comprising a diode 122, polarized to conduct the current from the output to the input, and a resistor 124 having a resistance R. A further diode 126 is connected directly between the inverting or negative input of amplifier 118 and the output thereof to conduct current toward the output. The junction 128 between diode 122 and resistor 124 is connected to a junction 132 through a resistor 130 having resistance of R/2. Junction 132 is connected to the junction 136, between the output of high-pass filter 92 and resistor 120, through a resistor 134 also having a resistance R.

Junction 132 is connected to the inverting or negative input of an operational amplifier 138, the non-inverting or positive input of which is grounded. A negative feedback loop from the output of amplifier 138 to its inverting or negative input comprises a capacitor 140 and a resistor 142 connected in parallel with each other, resistor 142 also having a resistance R. The output of amplifier 138 is a DC signal proportional to the amplitude of the AC component of the amplified detector signal from photoelectric detector 62.

This DC signal is applied to switches 96 and 98 through a lead 144, each switch comprising a CMOS switch 146 and 148, respectively, and each of these CMOS switches comprising two MOSFETS. Control voltges from photoelectric detectors 86, 88, respectively, are applied to the grids of the pairs of MOSFETS, each voltage being applied directly to the grid of one MOSFET and, through a respective inverter 150, 152, to the grid of the other MOSFET, of the associated pair.

Each photoelectric detector 86, 88 comprises a respective phototransistor 154 or 156, a respective resistor 158 or 160 being connected in the emitter circuit of each phototransistor, and the detector signals being derived from the emitters of the respective phototransistors. The signals supplied through CMOS switches 146 and 148 are applied to respective amplifier and memory circuits 100 and 102.

Amplifier and memory circuit 100 comprises an operational amplifier 162 whose inverting or negative input, on the one hand, is connected to ground through a resistor 164 and, on the other hand, is connected to the output of the operational amplifier through a negative feedback resistor 166. The output from COMS switches 146 is connected to the non-inverting or positive input of amplifier 162, and this input is connected to ground through a storage capacitor.

Amplifier and memory circuit 102 is designed in a manner similar to that of circuit 100, and comprises an operational amplifier 168, a storage capacitor 170 connected to the non-inverting or negative input of amplifier 168 and a negative feedback loop 172, the non-inverting input being connected to the output of COMS switches 148.

The outputs of the two amplifier and memory circuits are applied to a ratio forming circuit 104 which provides, in the same manner as in FIG. 6, a signal proportional to the ratio of the measuring and reference light fluxes. This signal is also applied to a lead 174 for further processing during normal operation of the apparatus.

In the modified embodiment of the invention shown in FIGS. 7 and 8, which is substantially identical to the embodiment of FIG. 3 as far as the remaining structural features are concerned, a reflex-reflector 176 is arranged to be moved into the light beam 54, as indicated in FIG. 8, closely in front of front lens 52, that is, on the apparatus side of the measuring path. Such movement is effected by means of a rotary magnet 178 or similar means. Rotary magnet 178 is energized periodically by a timer 180, shown in FIG. 7, through a lead 182, for example every hour for a duration of 1 minute. At and for the same time, a switch 184 is closed by timer 180 and, through switch 184, the output signal from ratio forming circuit 104 is applied to one input of a comparator 186. The other input of comparator 186 is connected to a reference voltage source of, for example, 10 volts through a voltage divider chain comprising resistors 188 and 190. If it is assumed that the ideal value of the output signal from ratio forming circuit 104, with the measuring light flux not being attenuated along the measuring path, is equal to the reference voltage of 10 volts, then the resistances of resistors 188 and 190 can be selected with a ratio of 2:98. Thus, comparator 186 will change its state, if the measuring light flux, upon moving reflex-reflector 178 into beam 54, drops by more than 2 percent below this ideal value, due to contamination of front lens 52. In this case, a signal lamp 192, for example, may be switched on or energized by comparator 186.

While specific embodiments of the invention have been shown and described in detail to illustrate the application of the principles of the invention, it will be understood that the invention may be embodied otherwise without departing from such principles.

What is claimed is:

1. An optical measuring apparatus, particularly a smoke or visibility meter, comprising, in combination, a light source; an optical system operatively associated with said light source and forming a light beam traversing a measuring distance; a reflex-reflector in the path of said light beam and having said light beam impinging thereon; a beam splitter positioned in the path of rays of said light beam and inclined with respect to the optical axis of said light beam to direct light, reflected by said reflex-reflector, laterally of said optical axis as a measuring light flux; a photoelectric detector positioned in the path of measuring light flux directed laterally of said optical axis by said beam splitter; and reflector means operable to intersect said light beam between said beam splitter and said reflex-reflector to produce a reference light flux, from said light source, impinging on said detector in alternation with said measuring light flux, said reflector means including a reflector surface movable periodically to intersect the path of rays of said light beam and reflecting the rays in a substantially diffuse manner to said beam splitter.

2. An optical measuring apparatus, as claimed in claim 1, in which said reflector means is a rotatable sector disc extending into said path of rays and having said reflector surface.

3. An optical measuring apparatus, as claimed in claim 2, in which said sector disc is formed with two diametrically opposite sectors each extending through 90° and each having said reflector surface thereon.

4. An optical measuring apparatus, as claimed in claim 3, in which said diametrically opposite sectors comprise diametrically opposite vanes; said sector disc comprising a circular central portion having two pairs of circular arcuate slots with each slot extending through 90° and being offset, with respect to adjacent slots, by 90°; the slots of each pair being diametrically opposite each other and being offset radially with respect to the slots of the other pair; respective correspondingly radially offset photoelectric detectors adjacent said slots and each arranged to be illuminated through the slots of a respective pair to produce respective trigger signals; and a signal processing circuit connected to said radially offset photoelectric detectors to receive said trigger signals.

5. An optical measuring apparatus, as claimed in claim 4, including a light conduit extending from said light source to one side of said sector disc in radial alignment with said arcuate slots to illuminate said two last-named photoelectric detectors.

6. An optical measuring apparatus, as claimed in claim 2, including a rotatable shaft mounting said sector disc; and a perforated disc secured to said shaft for conjoint rotation with said sector disc and modulating said light beam; said beam splitter being positioned between said perforated disc and said sector disc.

7. An optical measuring apparatus, as claimed in claim 1, further comprising first and second amplifier and memory circuits; respective controlled electronic switches connecting said amplifier and memory circuits to the output of said photoelectric detector; means actuating said controlled electronic switches in synchronism with the change between the incidence of measuring and reference light fluxes on said photoelectric detector; and a quotient forming circuit connected to the outputs of said first and second amplifier and memory circuits to form the quotient of the output signals of the latter.

8. An optical measuring apparatus, as claimed in claim 7, including a rotatable shaft mounting said sector disc; a perforated disc secured to said shaft for conjoint rotation with said sector disc; said beam splitter being located between said perforated disc and said sector disc; and an active high-pass filter and a rectifier connected in series between said photoelectric detector and said controlled electronic switches to apply the output signal from said photoelectric detector to said controlled electronic switches.

9. An optical measuring apparatus, as claimed in claim 1, in which said optical system includes a front lens closing the apparatus and facing in the direction of said measuring distance; a 100 percent reflector, returning substantially all light incident thereon, mounted for movement into said path of rays outwardly of said front lens but at the entrance to said measuring distance; and means operable to compare the measuring light flux from said 100 percent reflector with said reference light flux to determine the degree of contamination of said front lens.

10. An optical measuring apparatus, as claimed in claim 9, including timer means operable to insert said 100 percent reflector into said path of rays at predetermined time intervals and for predetermined times.

* * * * *